United States Patent
Asazu

(10) Patent No.: US 6,704,750 B2
(45) Date of Patent: Mar. 9, 2004

(54) MIDDLEWARE AND MEDIA DATA AUDIOVISUAL APPARATUS USING MIDDLEWARE

(75) Inventor: Hideki Asazu, Tokyo (JP)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 09/835,599

(22) Filed: Apr. 16, 2001

(65) Prior Publication Data

US 2001/0049691 A1 Dec. 6, 2001

(30) Foreign Application Priority Data

Apr. 18, 2000 (JP) ..................................... P2000-116392

(51) Int. Cl.⁷ ............................................. G06F 17/00
(52) U.S. Cl. .......................... 707/104.1; 707/3; 707/10; 707/100
(58) Field of Search .................... 707/1–10, 100–104.1; 709/328–332; 717/162–167; 725/131–133, 91–93, 114, 116; 348/723

(56) References Cited

U.S. PATENT DOCUMENTS 6,134,594 A * 10/2000 Helland et al. ............. 709/229
6,442,620 B1 * 8/2002 Thatte et al. ............... 709/316
6,463,444 B1 * 10/2002 Jain et al. ................. 707/104.1
6,466,970 B1 * 10/2002 Lee et al. ................... 709/217
6,499,137 B1 * 12/2002 Hunt ......................... 717/164
6,546,553 B1 * 4/2003 Hunt ......................... 717/174

* cited by examiner

Primary Examiner—Kim Vu
Assistant Examiner—Joon Hwan Hwang
(74) Attorney, Agent, or Firm—Jay H. Maioli

(57) ABSTRACT

Middleware operating under control of a media data audiovisual apparatus having functions of storing media data for replaying includes a media data management section for providing the media data management functions including replaying, readout, recording, deletion and synthesis of media data and also recording of an access history to the media data, a meta-data management section providing the meta-data management functions including readout, recording and dynamic creation of meta-data and also transaction processing attendant upon an access to the meta-data, and a query section having the functions of providing more highly abstractive access interface for an application program through vicarious execution of the processing for an access to the media data management section and the meta-data management section, wherein the middleware is configured to provide the functions as a database of the media data for the application program as a whole.

12 Claims, 16 Drawing Sheets

FIG. 14
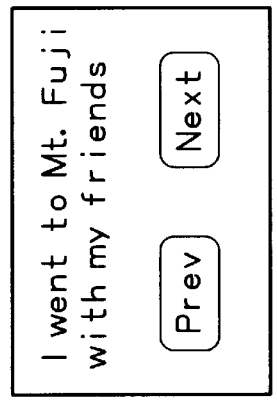
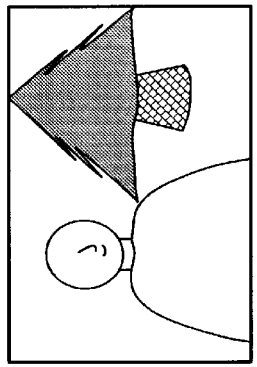
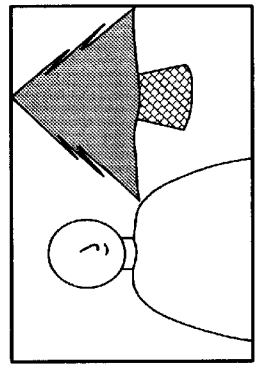

FIG. 15

```
import queryInterface.QTPlugInDescriptor;

public class ConcreteQTPlugInDescriptor
    implements QTPlugInDescriptor { public Class getType() {
    return ConcreteQTPlugIn.class;
  } public String getDeveloper() {
    return "XXX Corporation";
  } public String getVersion() {
    return "2.3_p14";
  } public String getAuthKey() {
    return "9598468074f2691f0630cce56dc45502";
  } public String getDescription() {
    return "Concrete QTPlugIn component";
        + "designed as sample.";
  }
}
```

MIDDLEWARE AND MEDIA DATA AUDIOVISUAL APPARATUS USING MIDDLEWARE

BACKGROUND OF THE INVENTION

1. Field of the Invention

This invention relates to middleware and a media data audiovisual apparatus with the middleware.

2. Description of the Related Art

Development of digital technique is making it possible to store mass of media data for its applications without degradation. In particular, with a tendency toward lower cost of processors and recording devices, digital recording apparatuses employing hard discs to the recording devices are being offered recently to the public.

In these digital recording apparatuses, not only hardware functions but also what is made possible by making the best use of the hardware functions is of importance, and software is therefore being recognized to be more significant functions. In this connection, there is a demand for efficient development of an attractive application program.

However, in the related art, an application program has been developed individually every apparatus, resulting in the need for higher cost to develop the application program.

Particularly, extraction of necessary portions for the application program from mass of media data is considered to be the common processing required for most application programs from the viewpoint of characters of the apparatus, whereas no more than an access to EPG (Electronic Programming Guide) has been applied to the above processing in the related art.

The above access method permits an access to media data in content data units with information such as genre and appearance actors/actress using as keys through the use of EPG, while being limited to an access to the contents of each media data as desired.

That is, in case of video data, for instance, since the video data is normally managed as an array of a plurality of time-based continuously-ordered frame images, the above access method also permits an access to the frame images by specifying a time and a frame number through the use of EPG.

However, it is difficult to access contents of each media data as desired. With the above access method by use of EPG, it is difficult to extract only frame image portions representative of a certain appearance actor/actress from the video data for continuous replaying, or to join only specific scenes together for creation of a digest version of specific scenes.

An access by use of meta-data is considered to be available as one of methods for an access to the contents of each media data as desired. It is to be understood that meta-data represents data about data and involves data in general for supporting an access to media data, and EPG is included in the meta-data as well.

The meta-data includes information such as "What kind of scene are visual and audio parts or the like segmented into?" and "What or who is represented in each scene or frame?" or the like, as well as information like "Which content data or scene has been viewed and listened by each individual user before now?", and "When and by whom was each content data or scene viewed and listened?" or the like. Thus, information to the effect that "Which part of which media data is a certain appearance actor/actress represented in?" or the like may be grasped through the use of meta-data, permitting an access based on the media data contents to the media data like the processing of "extracting scenes representative of a certain appearance actor/actress".

SUMMARY OF THE INVENTION

The meta-data is acquired in a variety of formats from various sources, inclusively of meta-data varied in a format of media data, meta-data distributed together with media data through data broadcasting, meta-data acquired through external network such as internet, meta-data automatically created through an analysis relating to media data on the apparatus side, meta-data created attendant upon an audiovisual history of media data like an audiovisual history on a user basis and meta-data created by a user oneself or the like. For that reason, it is not easy to create an application program permitting an access to media data by use of these meta-data, and besides, a great effort is required for development of the application program permitting an access to media data by use of meta-data.

An object of the present invention is to provide middleware permitting a versatile access of frame image portions of media data by use of meta-data, and a media data audiovisual apparatus installed with the middleware.

Another object of the present invention is to provide middleware permitting an execution of media data synthesis process, and a media data audiovisual apparatus installed with the middleware.

Still another object of the present invention is to provide middleware, which permits significant access of frame image portions representative of a certain appearance actor/actress to media data by use of meta-data, execution of media data synthesis such as creation of a digest of media data and also efficient development of an application program having the above functions, and also a media data audiovisual apparatus installed with the middleware.

To attain the above objects, in accordance with one embodiment of the present invention, there is provided a computer program of middleware for an apparatus such as a media data audiovisual apparatus which stores and replays media data. The computer program according to the present embodiment comprises; (a) media data management means providing media data management functions including replaying, readout, recording, deletion and synthesis of media data, and recording of an access history to media data; (b) meta-data management means providing meta-data management functions including readout, recording and creation of meta-data, and transaction processing attendant upon an access to meta-data; and (c) query means providing highly abstractive access interface for an application program through vicarious execution of the processing for an access to said media data management means and said meta-data management means. The computer program according to the present embodiment is configured to provide functions of a database of the media data for the application program as a whole.

The computer program according to the present embodiment permits a significant access of frame image portions representative of a certain appearance actor/actress to media data by the use of meta-data managed by the meta-data management means, execution of media data synthesis such as creation of a digest of media data through the use of the functions of the media data management means and, also efficient development of the application program having the above functions through the use of the functions of the query means.

In another embodiment of the present invention, the media data management means may be configured to record an access history to the media data by converting access history information into meta-data for recording into the meta-data management means.

The computer program of middleware according to the above embodiment of the present invention permits unified management of audiovisual history information on a user basis as well through both the middleware and the application program similarly to other meta-data. Thus, the size of the application program may be held as small as possible, and besides, the audiovisual history information may be interchanged among other audiovisual apparatuses installed with the same middleware through conversion of the access history information into the meta-data.

In another embodiment of the present invention, the media data management means may be configured to record the media data by creating meta-data for recording into the meta-data management means through application of a pre-registered data analysis process on inputted media data.

The computer program of middleware according to the above embodiment of the present invention permits creation of meta-data together with the media data on the side of the audiovisual apparatus even when the meta-data is not provided, and also may operate the application program utilizing the meta-data.

In still another embodiment of the present invention, the functions of meta-data creation of the meta-data management means may be separated as an independent plug-in component, and the computer program of middleware may be configured to provide; (a) a function to incorporate dynamically said plug-in component into a system; (b) a function of aborting disused plug-in component; and (c) a function of selecting and executing automatically a plug-in component which matches a purpose of an application program out of the already incorporated plug-in components.

The computer program of middleware according to the above embodiment of the present invention permits dynamic incorporation of meta-data, unified management of meta-data through conversion of the meta-data obtained from various sources into a format interpretable by the middleware and also installation of new algorithm/formats, even if would be developed in future, without the need for changes of the middleware/system.

In still another embodiment of the present invention, said functions of said query means to provide highly abstractive access interface for the application program through vicarious execution of the processing for an access to said media data management means and said meta-data management means as an independent plug-in component, and the computer program of middleware may be configured to provide; (a) a function to incorporate dynamically said plug-in component into a system; (b) a function of aborting disused plug-in component; and (c) a function of searching a plug-in component which satisfy a condition indicated by an application program out of the already incorporated plug-in components.

The computer program of middleware according to the above embodiment of the present invention permits extension of the middleware functions at need to meet various requests from the application program and also may divide the work for development of the application program between a developer engaged in development of the basic functions by use of the functions of the meta-data management means and the media data management means and a developer engaged in development of the functions of the whole application program by use of the basic functions, resulting in further improvement on development efficiency of the application program.

To attain the above objects, in accordance with one embodiment of the present invention, there is provided a media data audiovisual apparatus having the functions of recording and replaying media data. The media data audio visual apparatus of the present embodiment comprises a media data recording device for storing the media data, a meta-data recording device for storing meta-data and a processor for interpreting and executing an application program. The media data audiovisual apparatus of the present embodiment is installed with the middleware in accordance with above described embodiments of the present invention.

The media data audiovisual apparatus according to the one embodiment of the present invention permits the application program to be operated by making the best use of its characteristics in storage of media data, resulting in the efficient utilization of a mass of media data.

In accordance with one embodiment of the present invention, there is provided a computer program or a memory containing the computer program, a method of using a computer processor according to the computer program, or an apparatus installed with the computer program. The computer program may comprise: media data management means providing media data management functions including at least one of replaying, readout, recording, deletion and synthesis of media data, and recording of an access history to media data; meta-data management means providing meta-data management functions including at least one of readout, recording and creation of meta-data, and transaction processing attendant upon an access to meta-data; and query means providing an access interface for an application program through vicarious execution of the processing for an access to said media data management means and said meta-data management means.

BRIEF DESCRIPTION OF THE DRAWINGS

The foregoing and other objects and features of the invention will become apparent from the following description of preferred embodiments of the invention with reference to the accompanying drawings, in which:

FIG. 14 is a schematic view showing a QT plug-in component;

FIG. 15 illustrates a description of a QT plug-in descriptor interface 41; and

DETAILED DESCRIPTION OF PREFERRED EMBODIMENTS

Figure 1:
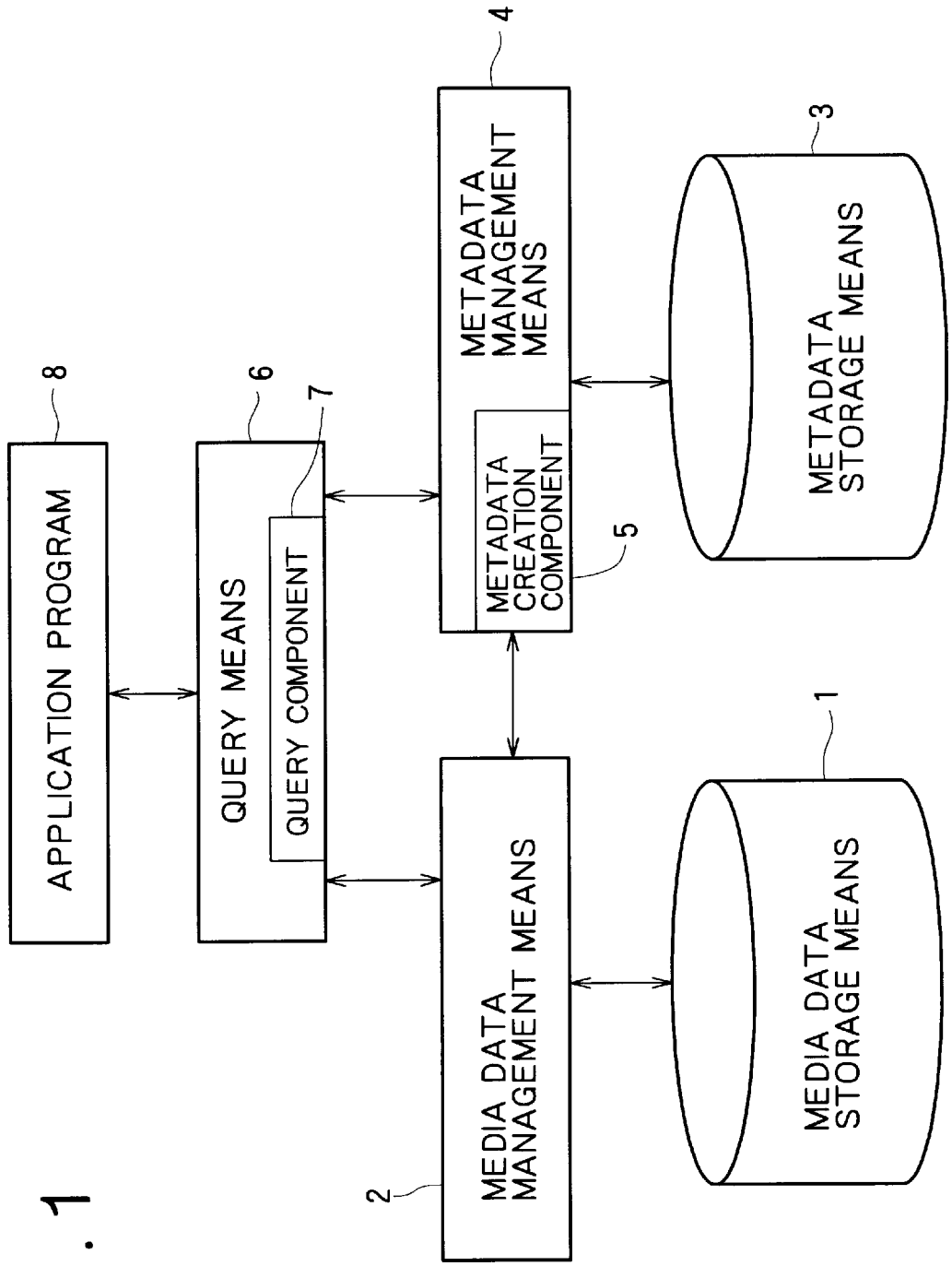
FIG. 1 is a block diagram showing a media data audiovisual apparatus including middleware according to one embodiment of the present invention.

FIG. 1 is a block diagram showing a media data audiovisual apparatus including middleware according to one embodiment of the present invention.

As shown in FIG. 1, the media data audiovisual apparatus comprises a media data storage means 1 for storing media data; a media data management means 2 for performing media data management process including replaying, readout and synthesis of media data stored in the media data storage means 1, recording of media data into the media data storage means 1 and also recording of a access history to media data; a meta-data storage means 3 for storing metadata; a meta-data management means 4 for performing meta-data management process including readout of metadata from the meta-data storage means 3, recording of meta-data into the meta-data storage means 3, dynamic creation of meta-data and also transaction processing attendant upon an access; a meta-data creation component 5 for executing processing including the dynamic creation of meta-data through an analysis of media data, conversion of meta-data distributed from outside of the system through a network or the like into meta-data of a format acceptable to the meta-data management means 4 and so on; a query means 6 functioning as a module for providing a simpler access interface acceptable to a user unskilled in programming for an application program 8 through vicarious execution of the processing for an access to the media data management means 2 and the meta-data management means 4; and a query component 7 including an independent access interface separated as a plug-in component from the query means 6.

The audiovisual apparatus of the present embodiment may be realized, for example, by a computer system including a memory unit storing programs and data, a CPU unit executing the programs, an user interface unit for outputting image/sound and accepting input operations from a user, and a communication unit for communicating outside apparatus via a network. Some or all of means and components of the present embodiment may be realized by computer programs (middleware) according to the present invention. The computer programs of middleware may be recorded on a computer readable medium, and installed to a computer system to realize an apparatus according to one embodiment of the present invention.

In the preferred embodiment of the present invention, the meta-data creation component 5 is separated from the meta-data management means 4, permitting dynamic addition of various data analysis algorithms and meta-data installers to a system for unified management of meta-data acquired from various sources.

According to the preferred embodiment of the present invention, the media data audiovisual apparatus has the query means 6 functioning as the module for providing the simpler access interface acceptable to the user unskilled in programming for the application program 8, permitting a relief of a burden on the side of the application program 8. That is, extraction of only frame image portions representative of a certain appearance actor/actress for continuous replaying may be divided into several processing between the media data management means 2 and the meta-data management means 4, while extremely complicated operations are required for performing these processing on the side of the application program 8 on all such occasions. In this connection, in the preferred embodiment of the present invention, the query means 6 is configured to permit a relief of the burden on the side of the application program 8 by providing more highly abstractive access interface acceptable to the user unskilled in programming as well.

Furthermore, in the preferred embodiment of the present invention, since the query component 7 is configured by separating the access interface as the independent plug-in component, these processing may be separated from the query means 6 for dynamic incorporation into the system, permitting the easy extension of the query means 6 in future to meet various requests from a variety of application programs.

A description will now be given of the details of the preferred embodiment of the present invention with reference to the application of Java (Trademark) developed by Sun Microsystems Co., Ltd.

Figure 2:
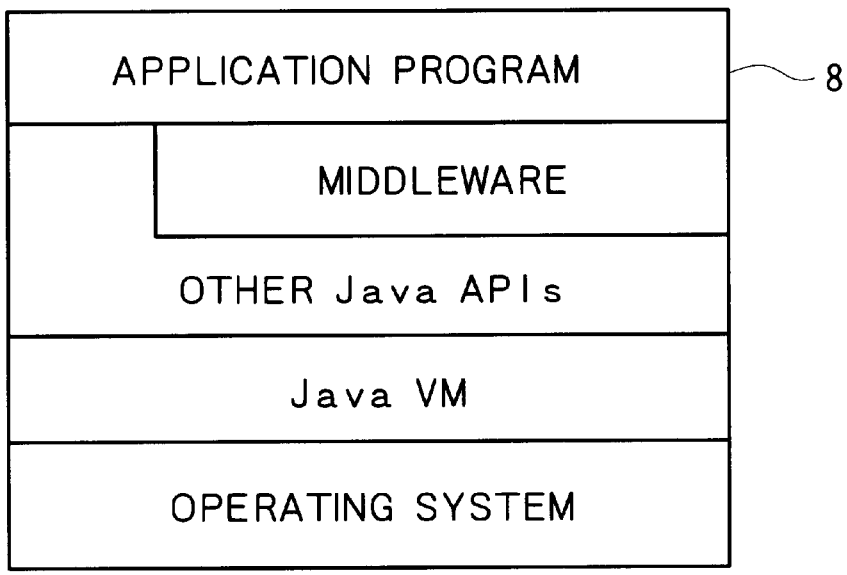
FIG. 2 illustrates a hierarchy of software, which configures a system.

FIG. 2 illustrates a hierarchy of software, which configures a system. As shown in FIG. 2, in the media data audiovisual apparatus including the middleware according to the preferred embodiment of the present invention, a Java VM (Java Virtual Machine) for interpreting byte codes of Java into execution operates under control of an operating system for performing management process of hardware resources. Further, a basic application program interface configuring the operating environment, in which Java is executed, is provided together with other extended application program interfaces.

The application program is to be described or run by making use of these Java application programs. The middleware according to the preferred embodiment of the present invention is provided as an extended application program interface of Java and provides the functions for management of media data and meta-data for the application program.

Figure 3:
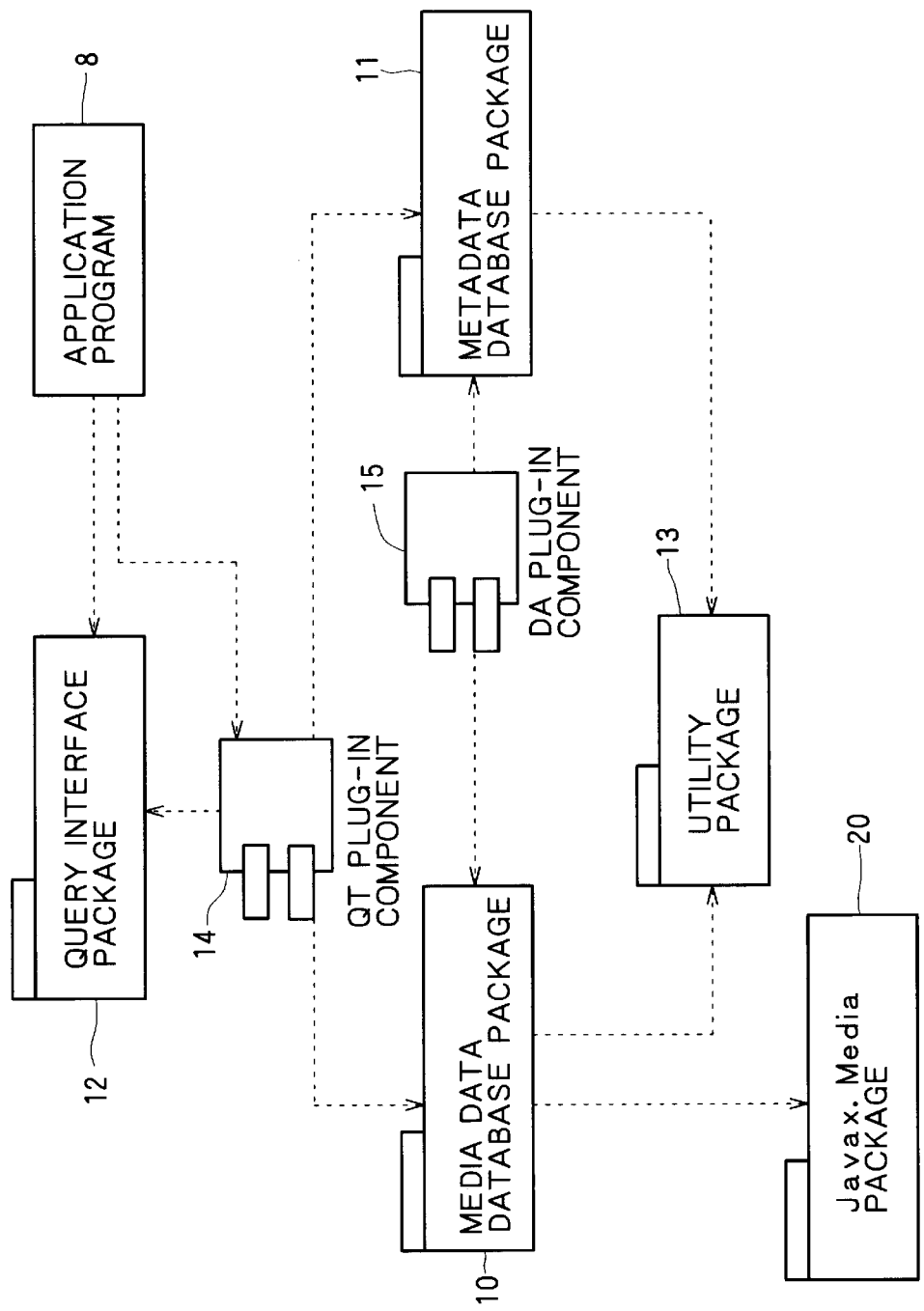
FIG. 3 illustrates the package configuration of middleware according to the preferred embodiment of the present invention.

FIG. 3 is a package diagram showing the package configuration of the middleware according to the preferred embodiment of the present invention with the use of UML (Unified Modeling Language). As shown in FIG. 3, the middleware according to the preferred embodiment of the present invention is composed of four packages and two kinds of plug-in components.

Specifically, as shown in FIG. 3, the middleware is composed of a media data database package 10 for implementing the functions of the media data management means 2 shown in FIG. 1, a meta-data database package 11 for implementing the functions of the meta-data management means 4 shown in FIG. 1, a query interface package 12 for implementing the functions of the query means 6 shown in FIG. 1, a utility package 13, in which utility classes utilized in common by other packages or components are gathered, a QT plug-in component 14 for implementing the functions of the query component 7 shown in FIG. 1, and a DA plug-in component 15 for implementing the functions of the meta-data creation component 5 shown in FIG. 1.

Figure 4:
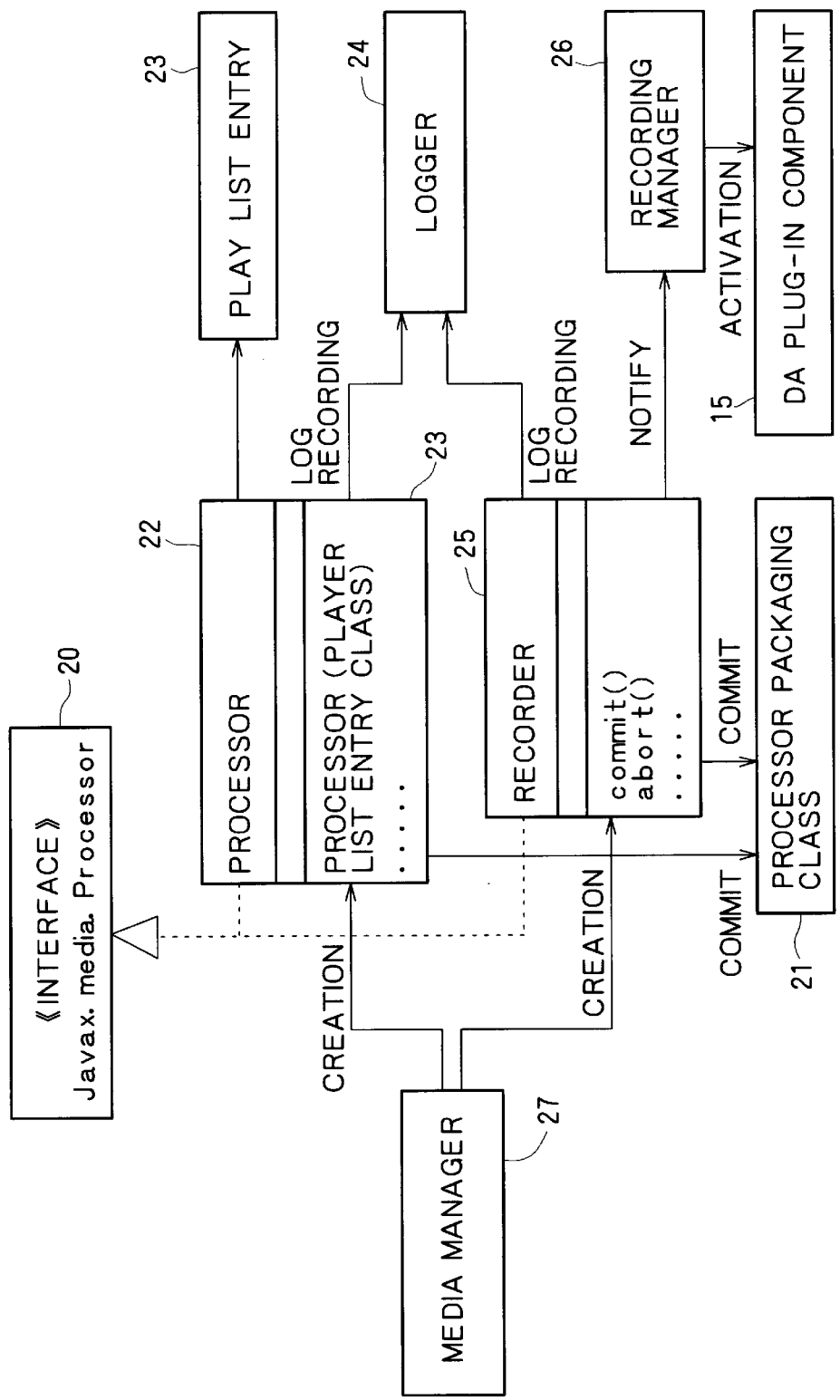
FIG. 4 is a class diagram showing the details of a media data database package.

FIG. 4 is a class diagram showing the details of the media data database package 10. The media data database package 10 is required for management of media data to provide the functions including replaying, readout, synthesis and deletion of media data stored in the media data storage means 1, recording of media data into the media data storage means 1 and also recording of an access history to media data or the like. In the preferred embodiment of the present invention, JMF (Java Media Framework) equivalent to an extended API of Java is used for the media data database package 10 to implement the basic functions including replaying, readout, synthesis, deletion and recording of media data or the like.

In FIG. 4, a Javax Media Processor interface 20 is prescribed by JMF to define an interface for a Java access to stream media data such as motion pictures and sound/voice. The Javax Media Processor interface 20 defined in JMF is configured that data decoding and rendering or like functions may be added as plug-in components, permitting synthesis of graphics and the stream media data such as motion pictures and sound/voice by making the use of the added functions. A Processor packaging class 21 belongs to a Javax Media Processor packaging class and is provided every platform. A processor 22 also belongs to the Javax Media Processor packaging class and has the functions resulting from extending the functions of the Processor packaging class 21 to provide the functions of synthesizing a plurality of media data specified by a play-list entry 23 for an access to the synthetic media data as one virtual media data and the functions of notifying information of an access to the media data to a logger 24 as will be described later. A recorder 25 also belongs to the Javax Media Processor packaging class and has the functions resulting from extending the functions of the Processor packaging class 21 similarly to the processor 22 to provide particularly the functions specialized in recording of media data. That is, the recorder is configured to provide the transaction functions for preventing mismatching from occurring in data recorded in a secondary recording device even if an accidental error occurs in recording of media data and the functions of creating meta-data through an analysis of data by activating the DA plug-in component 15 registered in a recording manager 26 in recording of media data. Further, a media manager 27 is configured to provide the functions such as creation of instances relating to the processor 22 and the recorder 25 and deletion of media data and so on. The logger 24 has the functions of recording an access to the processor 22 and the recorder 25 to create audiovisual history information on a media data basis or a user basis. The audiovisual history information created by the logger 24 is converted into meta-data, which is then stored in the meta-data storage means 3 by making the use of the functions of the meta-data database package 11.

Figure 5:
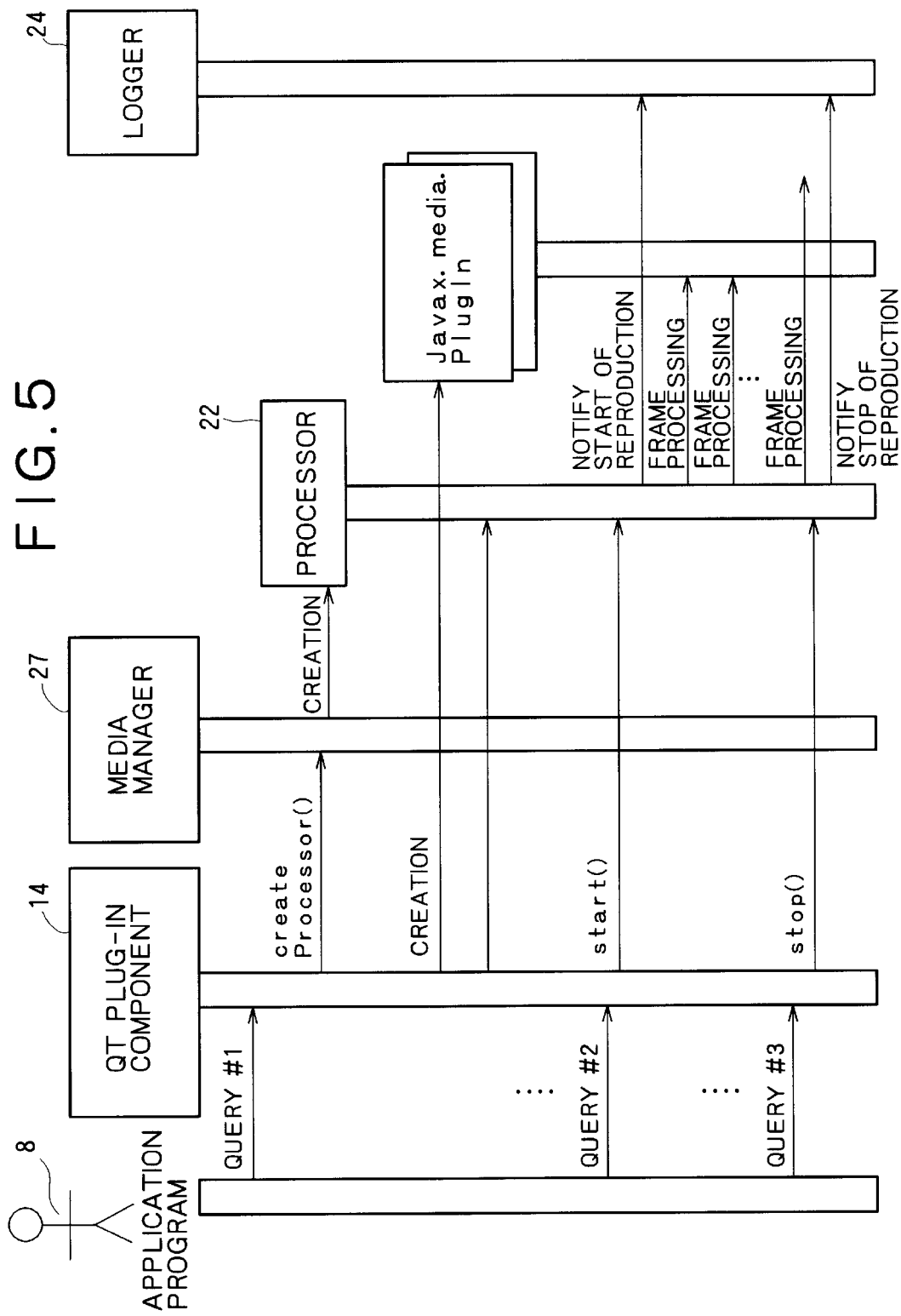
FIG. 5 is a sequence diagram showing the procedure of reproducing media data.

FIG. 5 is a sequence diagram showing the procedure of reproducing media data. In the preferred embodiment of the present invention, queries from the application program 8 are interpreted by the QT plug-in component 14 for conversion into processing requests for the media data database package 10.

In FIG. 5, three queries #1, #2 and #3 are supplied from the application program 8 to the QT plug-in component 14, and the processing to the effect that "Create processor", "Start replaying" and "Stop replaying" are executed in the media data database package 10 in response to these queries.

The following processing is executed in response to the query #1. Firstly, the QT plug-in component 14 calls a function of create Processor ( ) to the media manager 27 to create the processor 22 for reproducing the media data specified as argument. When there is a need for synthesis of graphic data and media data in replaying of the media data, the QT plug-in component 14 further creates appropriate Javax Media PlugIn. Incorporating the created Javax Media Plug In into the processor 22 brings about setup for replaying of media data.

The following processing is executed in response to the query #2. Firstly, the QT plug-in component 14 calls a function of start ( ) to the processor 22 to issue an instruction to start replaying of media data. Subsequently, the processor 22 notifies the logger 24 of the instruction to start replaying of media data. Upon receipt of a notice to the effect that the instruction to start replaying of media data is issued, the logger 24 updates history information of an access to the media data and creates media data newly at need for recording of meta-data through the media data database package 10. Then, the replaying of media data is started. In this case, previously incorporated Javax Media PlugIn is called sequentially for each frame into execution of the processing at need.

The following processing is executed in response to the query #3. The QT plug-in component 14 calls a function of stop ( ) to the processor 22 to issue an instruction to stop replaying of media data. The processor 22 notifies the logger 24 of the instruction to stop replaying of media data. Upon receipt of a notice to the effect that the instruction to stop replaying of media data is issued, the logger 24 updates the access history information to media data and creates media data newly at need for recording of meta-data through the media data database package 10.

Figure 6:
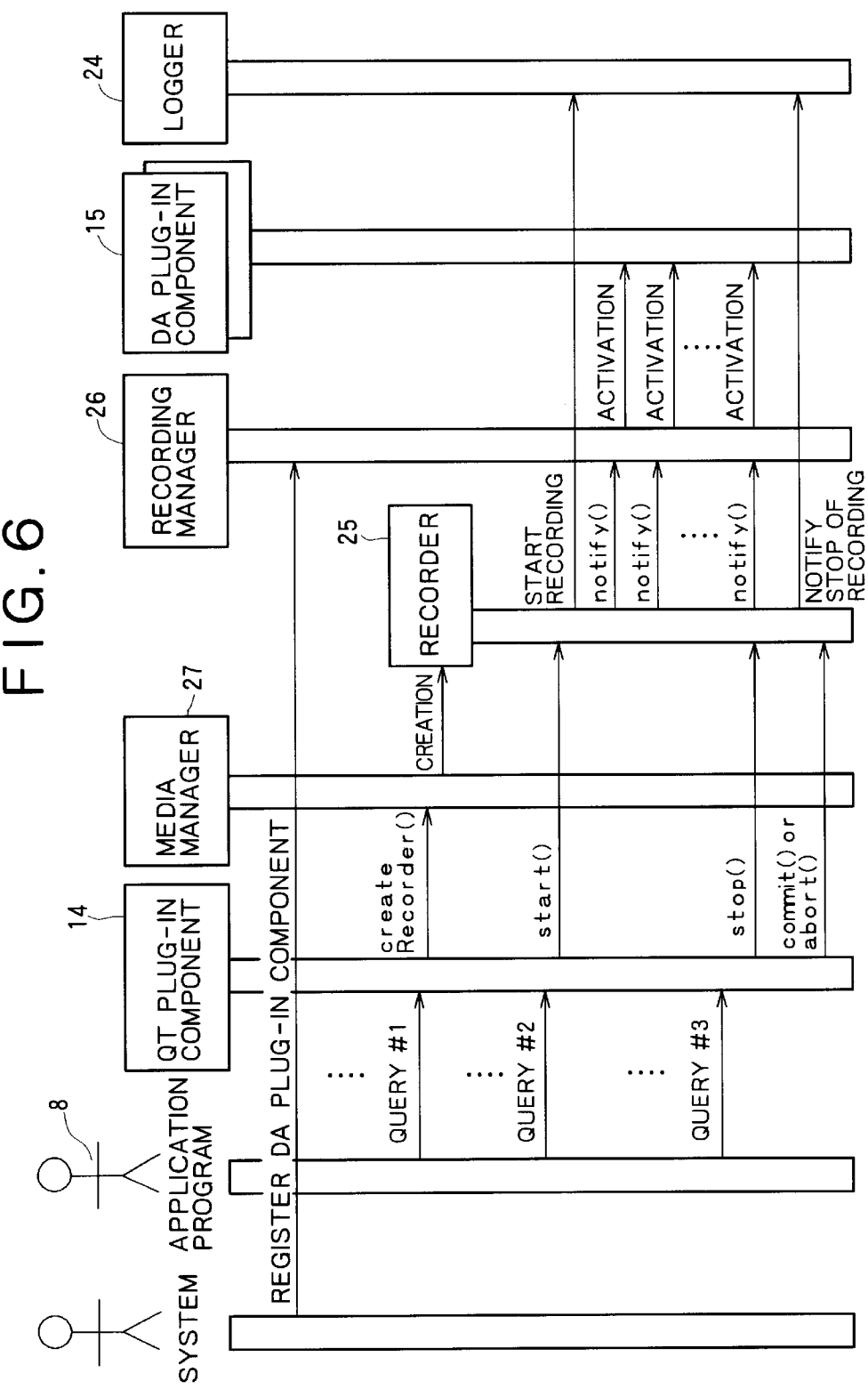
FIG. 6 is a sequence diagram showing the procedure of recording media data.

FIG. 6 is a sequence diagram showing the procedure of recording media data. In the preferred embodiment of the present invention, prior to all the processing, the system firstly needs to register the DA plug-in component 15 to be automatically activated in the recording manager 26 in recording of the media data. The registered DA plug-in component 15 executes an analysis of media data to create meta-data automatically. For instance, the processing of detecting a break of video scenes for recording as meta-data, that of specifying a appearance actor/actress represented in a video frame for recording as meta-data, that of detecting a caption contained in a video frame for recording as meta-data, that of executing a speaker recognition on audio information for recording as meta-data, and so on are required for the DA plug-in component to create the meta-data.

Subsequently, three queries #1, #2 and #3 are supplied from the application program 8 to the QT plug-in component 14 similarly to the case of the replaying of media data, and the processing to the effect that "Create recorder", "Start recording" and "Stop recording" are executed in the media data database package 10 in response to these queries.

The following processing is executed in response to the query #1. Firstly, the QT plug-in component 14 calls a function of create Recorder ( ) to the media manager 27 to issue an instruction to create a recorder class 25. The media manager class 27 creates an object of the recorder class 25 and returns the created object to the QT plug-in component 14.

The following processing is executed in response to the query #2. Firstly, the QT plug-in component 14 calls a function of start ( ) to the recorder 25 to issue an instruction to start recording of media data. Subsequently, the recorder 25 notifies the logger 24 of the instruction to start recording of media data. Then, the recorder 25 executes the recording of media data. In this case, the recorder 25 calls a function of notify ( ) to the recording manager 26 whenever each frame is processed. The recording manager 26 activates the DA plug-in component 15 registered by the system in advance per frame data. Each DA plug-in component 15 executes an analysis of frame data to create meta-data.

The following processing is executed in response to the query #3. The QT plug-in component 14 calls a function of stop ( ) to the recorder 25 to issue an instruction to stop recording of media data. The recorder 25 stops recording of media data, while notifying the logger 25 that recording of media data is stopped. The QT plug-in component 14 calls a function of commit ( ) to the recorder 25, resulting in completion of recording of media data. It is to be understood that calling a function of abort ( ) instead of the function of commit ( ) aborts all the media data and meta-data recorded or created in this session after calling of the function of start ( ), and the system is restored to its original state.

The meta-data database package 11 is required for management of meta-data to provide the functions including the readout of meta-data from the meta-data storage means 3, the recording of meta-data into the meta-data storage means 3, the dynamic creation of meta-data, and the transaction processing attendant upon an access or the like. The meta-data is expressed as a Java class in the meta-data database package 11.

Figure 7:
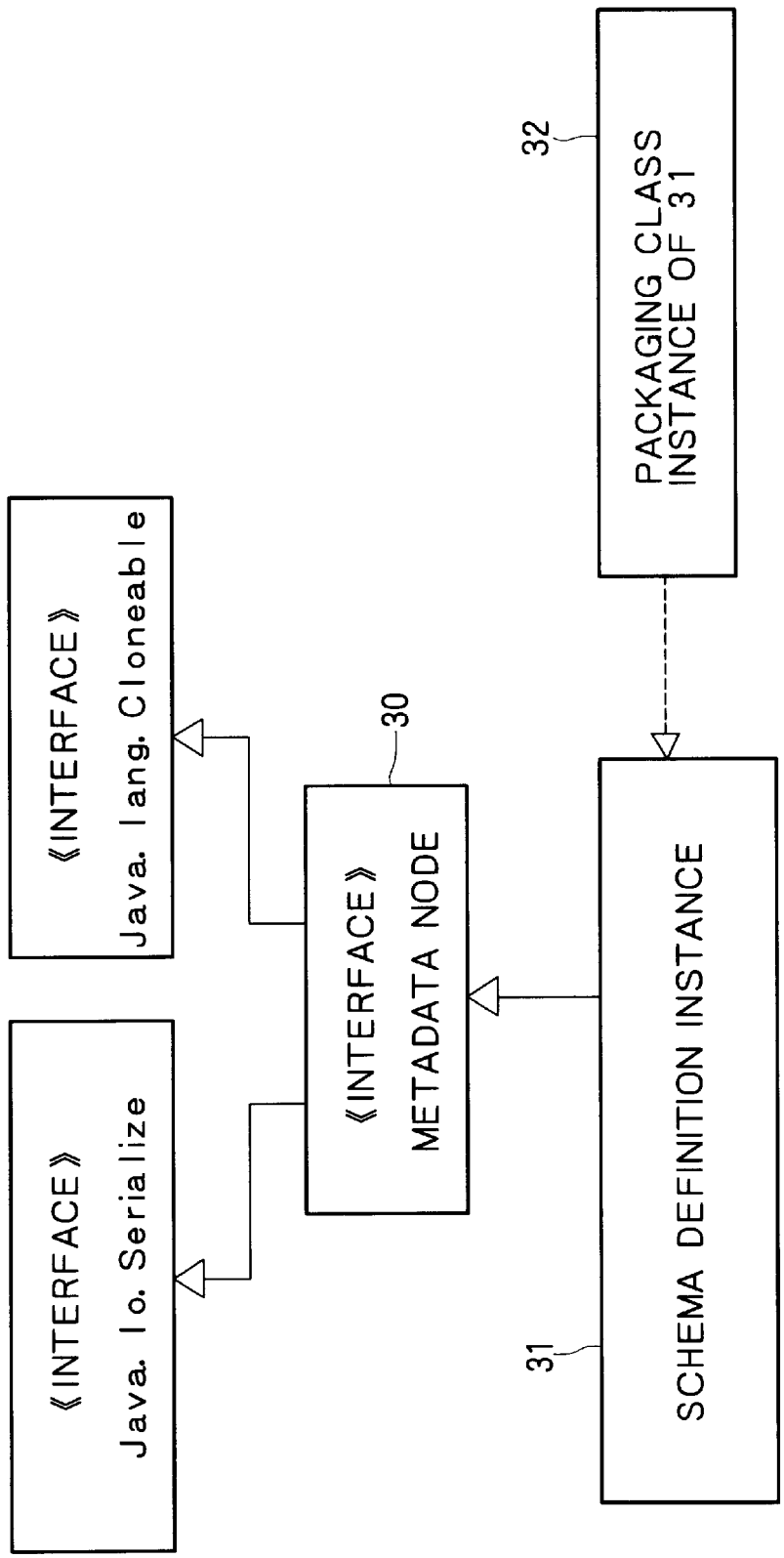
FIG. 7 is a class diagram showing a description class of meta-data.

FIG. 7 is a class diagram showing meta-data description classes. In FIG. 7, a meta-data node 30 is equivalent to an interface, in which properties required in common for all classes representing the meta-data are described. An instance 31 of real schema definition is defined as a Java interface by a meta-data designer in a form succeeding the meta-data node interface 30.

Figure 8:
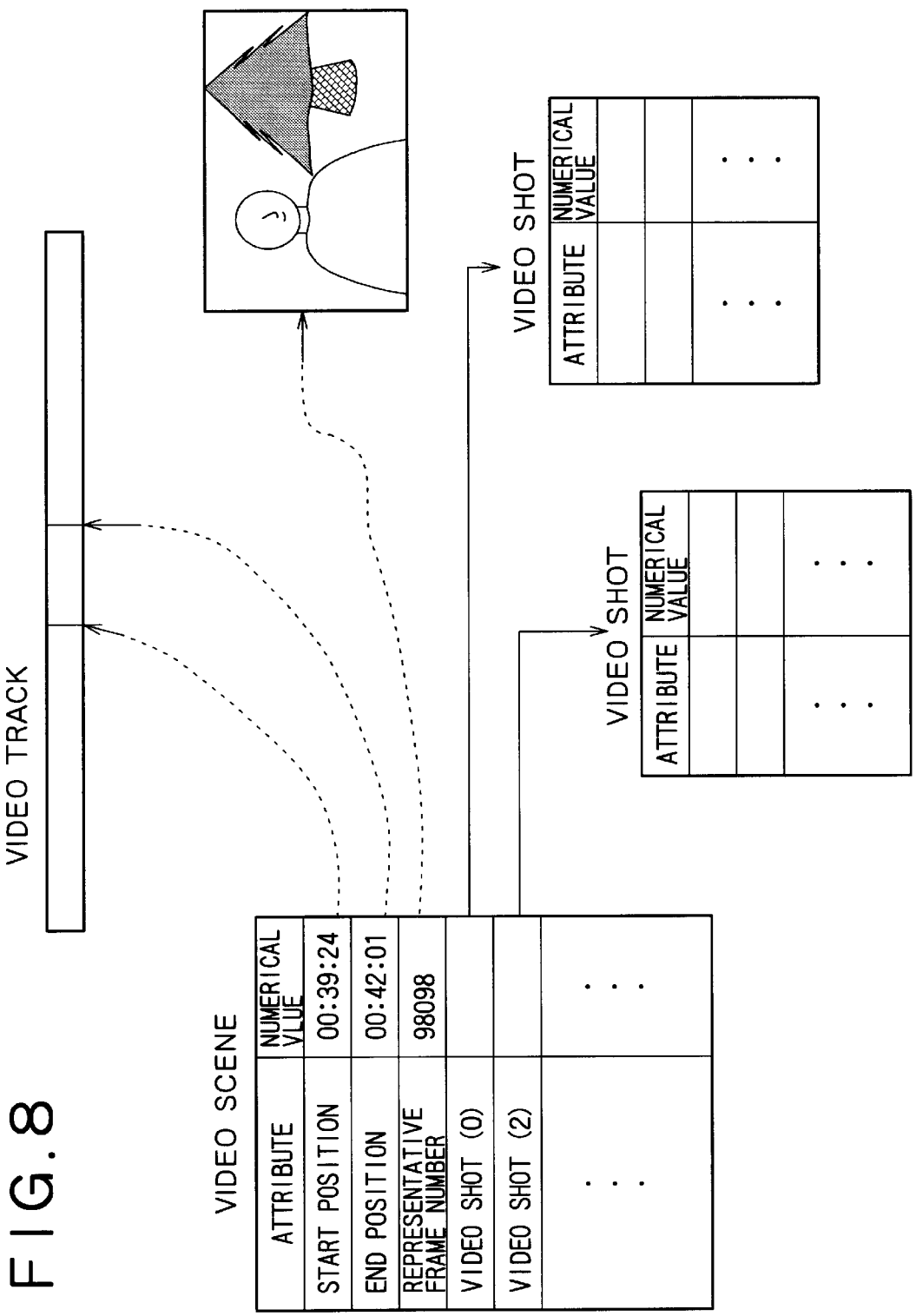
FIG. 8 is a schematic view showing meta-data.

FIG. 8 is a schematic view showing the meta-data. In an embodiment shown in FIG. 8, the meta-data representing video scene information to define the video scene. The video scene has attributes such as a start position, an end position, a representative frame number and a camera shot composing a scene or the like, and the access functions relative to these attributes are defined as shown in FIG. 8. In FIG. 8, video shots represent separately defined meta-data. In this embodiment, the video shots represent information relating to the camera shots.

The interface packaging class such as an instance 32 of the packaging class shown in FIG. 7 is defined by each system implementing personnel as to an interface defining such meta-data. In each packaging class, how each function is packaged is committed to each system implementing personnel. For instance, each system implementing personnel may make selection from various methods such as "a method of preparing a variable for every attribute to access the variable", "a method of making an access to a file or a database to obtain attribute values", "a method of acquiring information relating to the attribute through an external system connected via network" and "a method of analyzing media data to determine attribute values dynamically". As described the above, since the common interface is defined on the basis of the schema definition instance 31 even if different packaging is performed every system by each system implementing personnel, there is no need for rewriting the application program 8 for every system.

Figure 9:
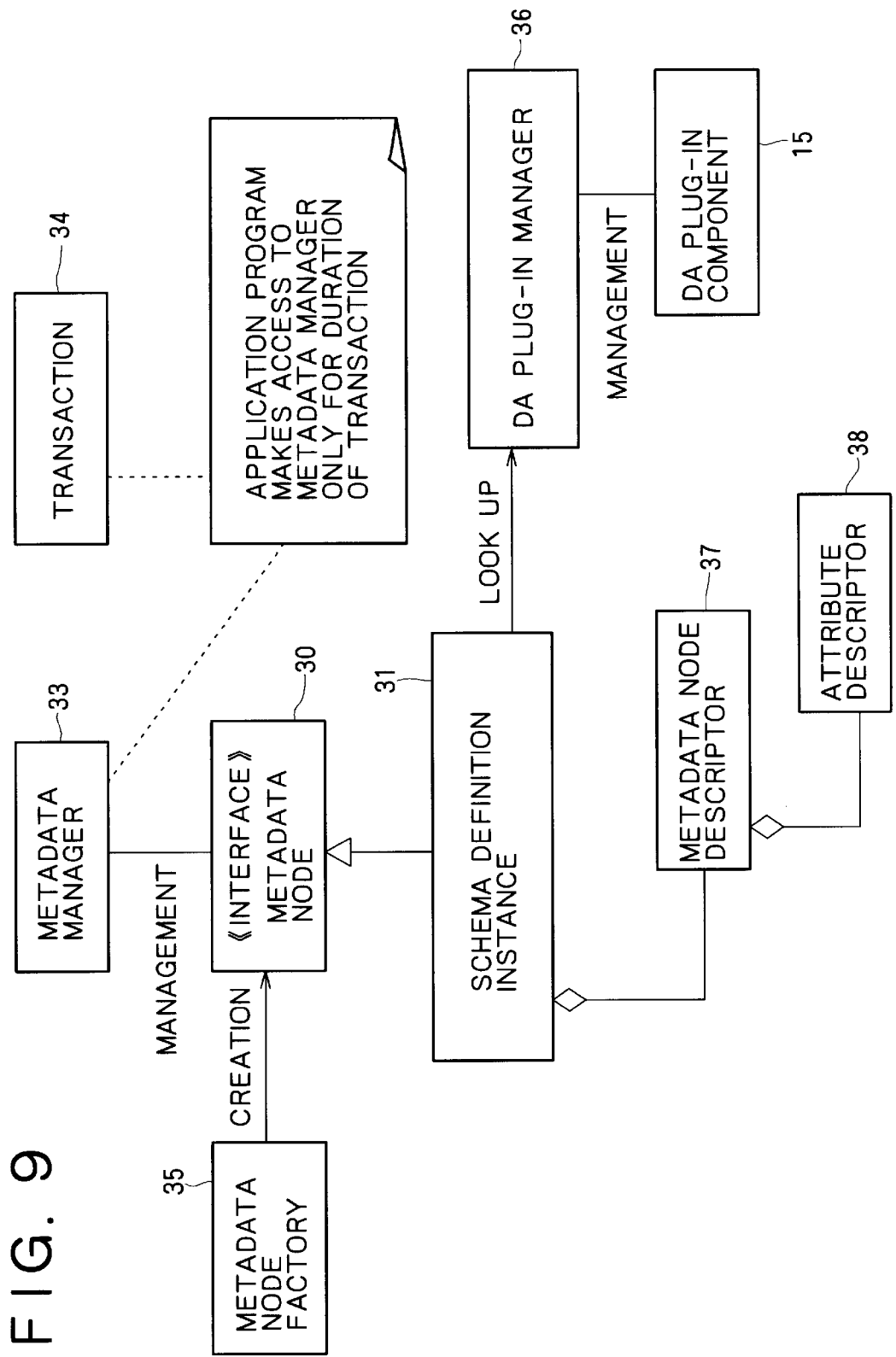
FIG. 9 is a class diagram showing the details of a meta-data database package.

FIG. 9 is a class diagram showing the details of the meta-data database package 11. In FIG. 9, a meta-data manager 33 is to provide functions required for management of entire meta-data. A transaction 34 is to provide functions required for management of transaction in case of an access to meta-data. A meta-data node factory 35 is to provide functions of selecting a packaging class inherent in each system for interface defining the meta-data to create an instance. The application program 8 or the QT plug-in component 14 permit the creation of an appropriate class instance by use of the selected packaging class without the need for any knowledge relating to the packaging class. A DA plug-in manager 36 is to manage the DA plug-in component 15 registered in the system. A meta-data node descriptor 37 and an attribute descriptor 38 belong to classes for description of meta-data definition and are provided by the meta-data designer similarly to the schema description instance 31. The meta-data node descriptor and the attribute descriptor permit the description of the processing over the entire meta-data by use of information described in these classes and Java reflection API without the need for any knowledge relating to each individual meta-data.

Figure 10:
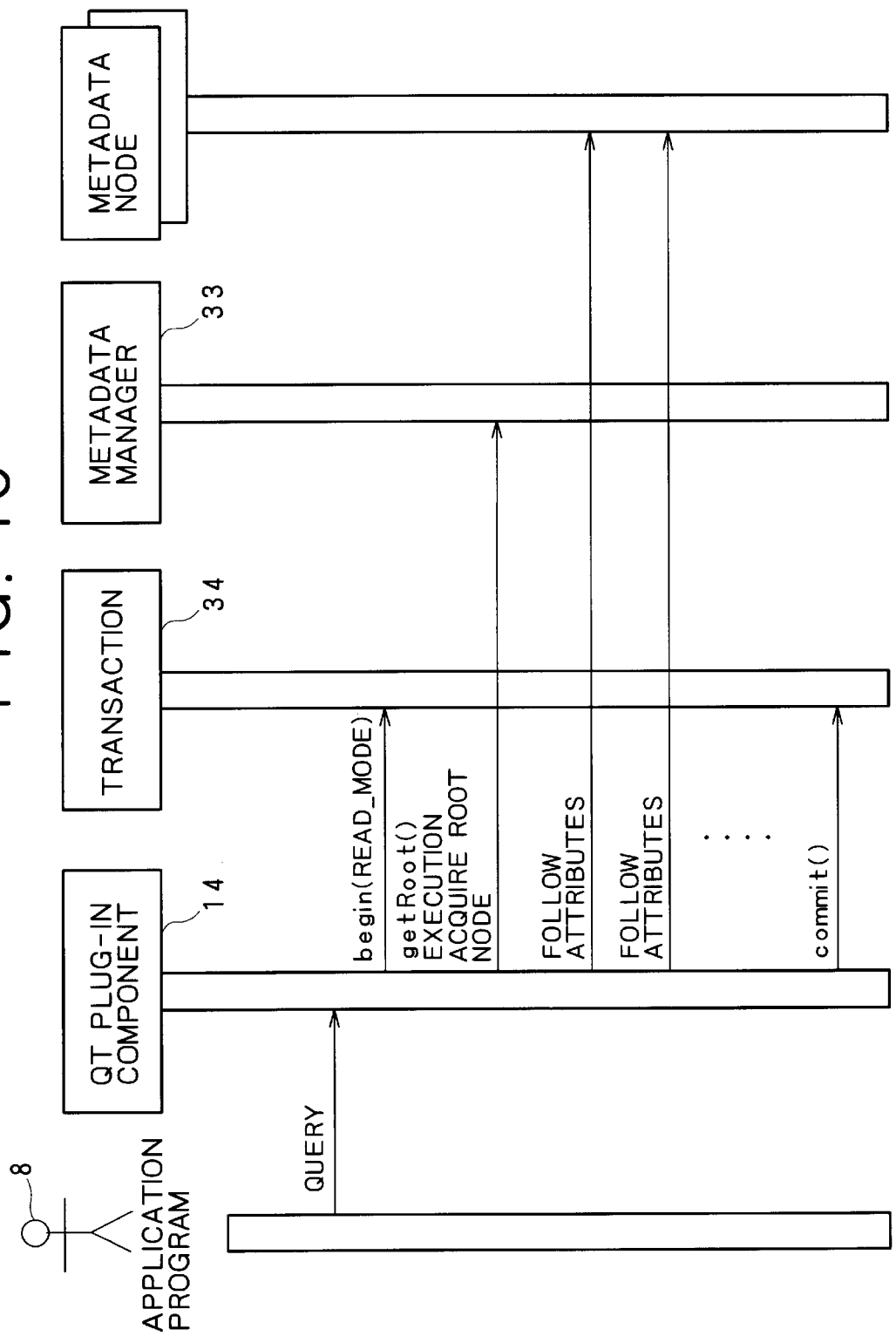
FIG. 10 is a sequence diagram showing the procedure of reading out meta-data.

FIG. 10 is a sequence diagram showing the procedure of reading out meta-data. As shown in FIG. 10, the meta-data is read out as follows.

Firstly, a query is supplied from the application program 8 to the QT plug-in component 14. Subsequently, the QT plug-in component 14 calls a function of begin ( ) to the transaction 34 to issue an instruction to start transaction in a read mode.

The QT plug-in component 14 further calls a function of getRoot ( ) to the meta-data manager 33 into execution to acquire a root node equivalent to meta-data applied to a start point in case of an access to the entire meta-data.

The QT plug-in component 14 follows the attributes from the root node in sequence to acquire information relating to the required meta-data. In this case, when an access to the target meta-data for accessing has been already made in a write mode through the other transaction, the processing for acquiring the information relating to meta-data is interrupted for the duration of the above access until the end of the other transaction. Thereafter, the QT plug-in component 14 resumes the processing to acquire the information relating to the required meta-data.

When the information relating to the required meta-data is acquired, the QT plug-in component 14 calls a function of commit ( ) to the transaction 34 to bring the transaction to an end.

Figure 11:
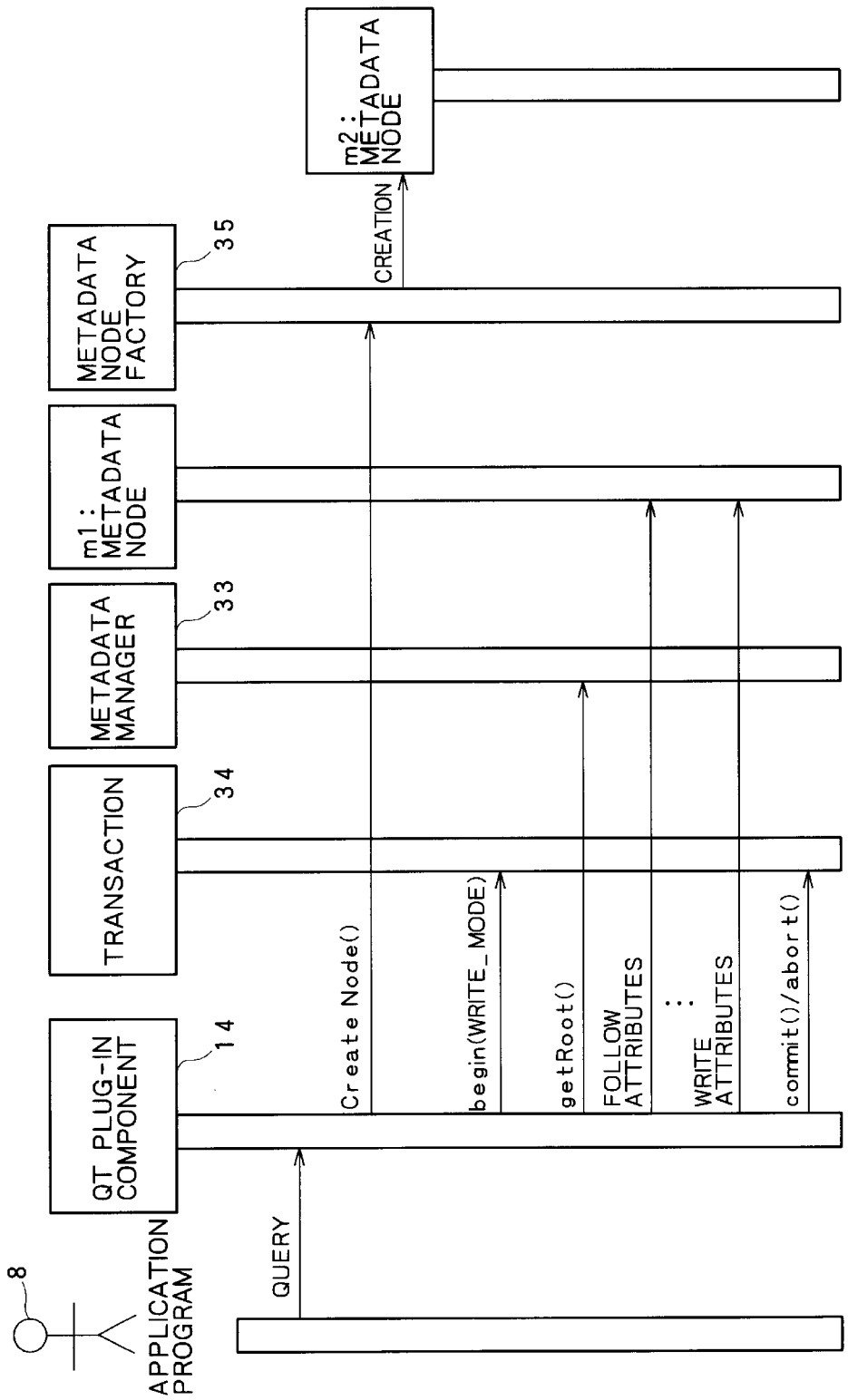
FIG. 11 is a sequence diagram showing the procedure of recording meta-data.

FIG. 11 is a sequence diagram showing the procedure of recording meta-data. As shown in FIG. 11, the meta-data is recorded as follows.

Firstly, a query is supplied from the application program 8 to the QT plug-in component 14. Subsequently, the QT plug-in component 14 calls a function of create Node ( ) to the meta-data node factory 35 to create new meta-data m2 to be recorded from now on.

The QT plug-in component 14 further calls a function of begin ( ) to the transaction 34 to issue an instruction to start transaction in a write mode.

Then, the QT plug-in component 14 calls a function of getRoot ( ) to the meta-data manager 33 into execution to acquire a root node equivalent to meta-data applied to a start point in case of an access to the entire meta-data. In this case, when an access of the target meta-data for accessing has been already made through the other transaction, the processing for acquiring the root node is interrupted for the duration of the above access until the end of the other transaction. Thereafter, the QT plug-in component 14 resumes the processing to acquire the root node.

The QT plug-in component 14 follows the attributes from the root node in sequence to acquire target meta-data m1 for updating.

Subsequently, the QT plug-in component 14 calls a function defined in m1 for addition of m2 or updating of the other attribute values. In this case, when an access to the target meta-data for accessing has been made already through the other transaction, the processing is interrupted for the duration of the above access until the end of the other transaction.

With addition of m2 or updating of other attribute values, the QT plug-in component 14 calls a function of commit ( ) to the transaction 34 to bring the transaction to an end. In this case, calling a function of abort ( ) instead of the function of commit ( ) aborts all changes made in this transaction, and the transaction is restored to its earlier state than starting.

Figure 12:
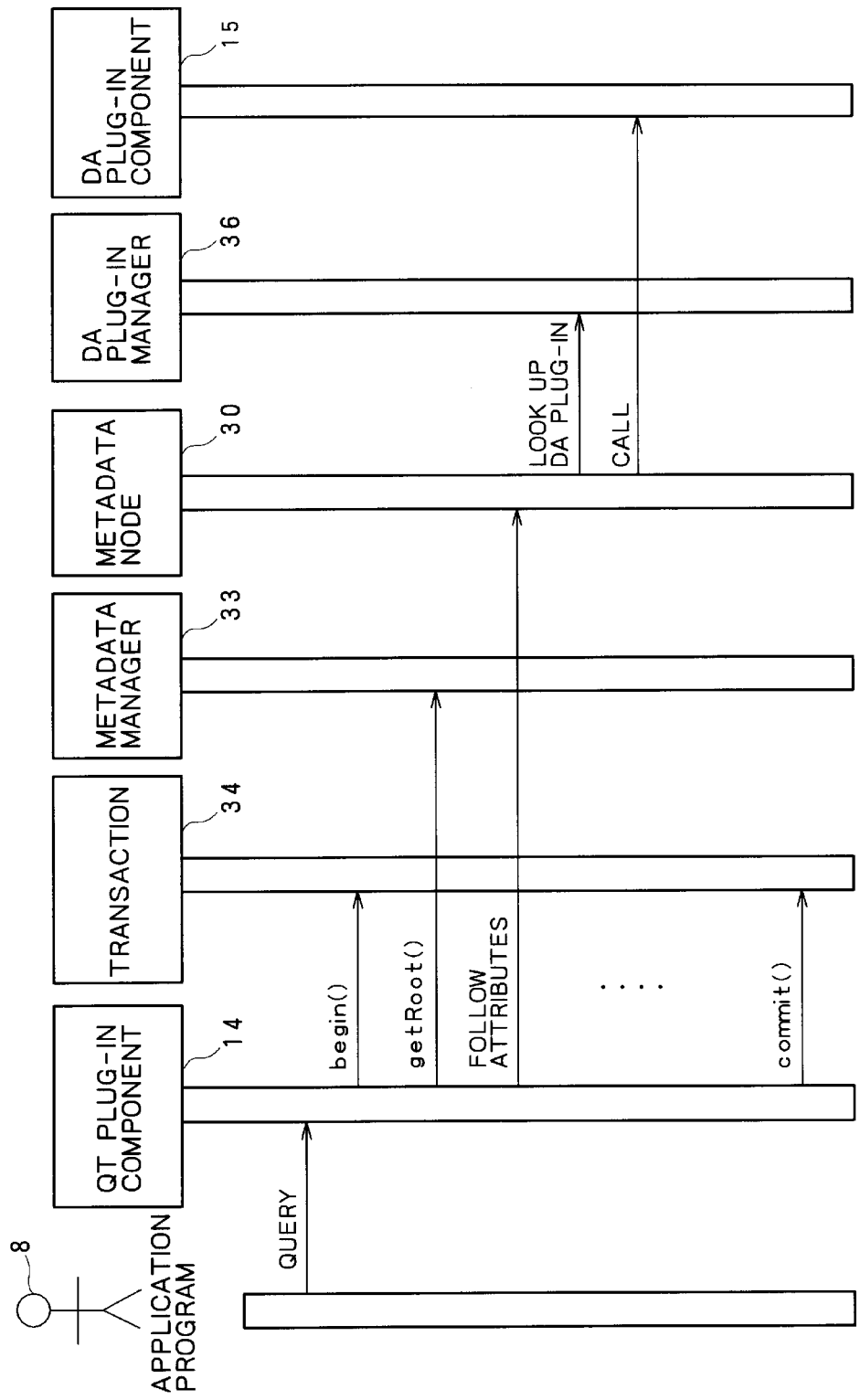
FIG. 12 is a sequence diagram showing the procedure of permitting meta-data to be created dynamically with an access to meta-data.

FIG. 12 is a sequence diagram showing the procedure of permitting meta-data to be created dynamically with an access to meta-data. As shown in FIG. 12, the meta-data is created dynamically with an access to the meta-data as follows.

Firstly, a query is supplied from the application program 8 to the QT plug-in component 14. Subsequently, the QT plug-in component 14 calls a function of begin ( ) to the transaction 34 to issue an instruction to start transaction.

The QT plug-in component 14 further calls a function of getRoot ( ) to the meta-data manager 33 into execution to acquire a root node equivalent to meta-data applied to a start point in case of an access to the entire meta-data, The QT plug-in component 14 follows the attributes from the root node in sequence to acquire information relating to required meta-data.

When a value to be determined dynamically is required for the accessed attribute, the meta-data node 30 supplies a query to the DA plug-in manager 36 to acquire the DA plug-in component 15 for looking up the required value.

The meta-data node 30 calls the DA plug-in component 15 to obtain the value of the accessed attribute. The QT plug-in component 14 calls a function of commit ( ) to the transaction 34 to bring the transaction to an end.

Figure 13:
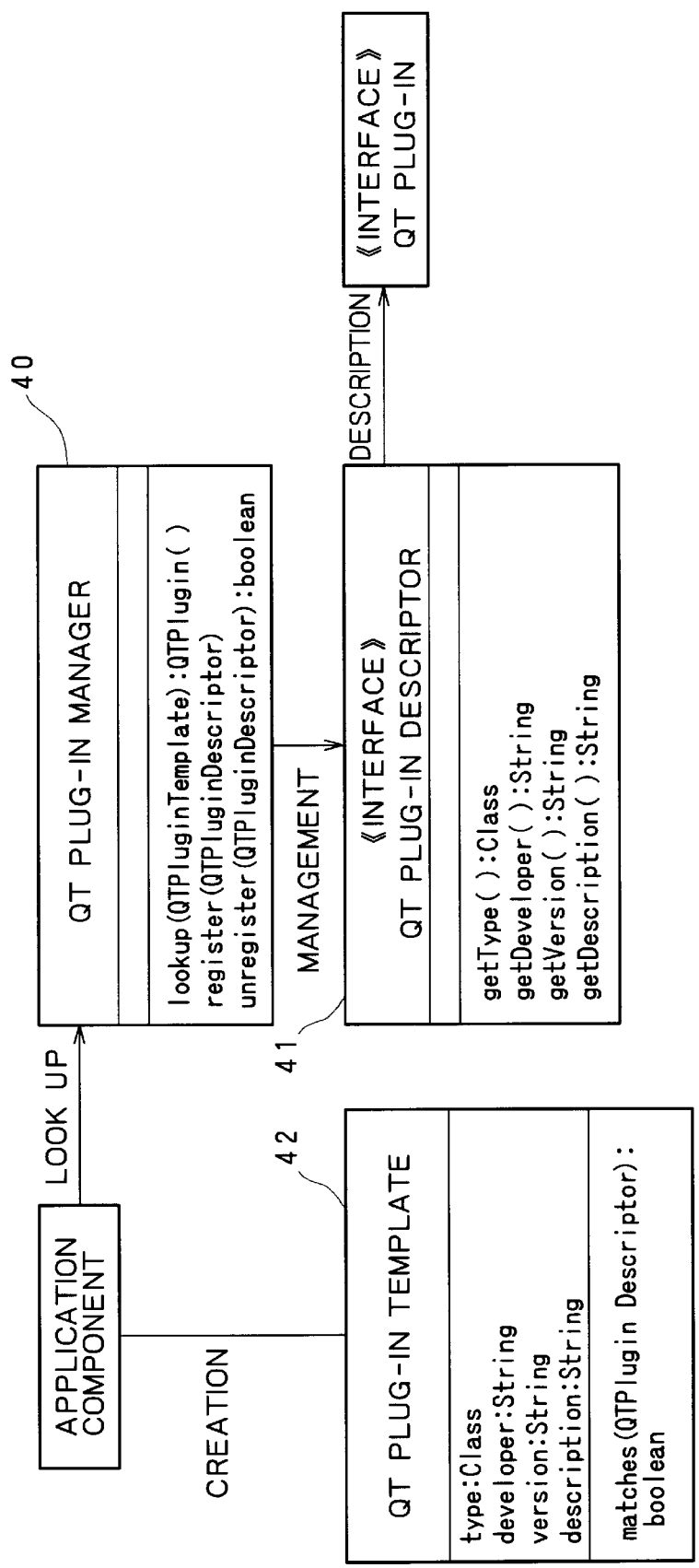
FIG. 13 is a class diagram showing a query interface package.

FIG. 13 is a class diagram showing the query interface package 12.

The query interface package 12 is to provide a service 5 utilizing meta-data and/or media data for the application program 8 by making use of the functions of the media data database package 10 and the meta-data database package 11. The service provided for the application program 8 involves "a service of displaying a list of contents recorded in the media data audiovisual apparatus to permit a user to select the contents", "a service of adding and/or displaying comments on content portions as meta-data", "a service of informing a user of the presence of comments by displaying a mark in the corner of a display screen or making sound/voice when approaching the comment-added portion, while performing the audiovisual operation of the contents", "a service of creating a digest of contents for replaying by picking up the comment-added portion" or like service made available through simple API by extracting high level functions applicable to a plurality of application programs 8 in common.

In the preferred embodiment of the present invention, these services is separated from the package body as the QT plug-in component 14, and the query interface package 12 itself is configured to provide only the management and/or look-up functions of the QT plug-in component 14, permitting dynamic addition of various services in future.

In the preferred embodiment of the present invention, the QT plug-in component 14 is created as JavaBeans equivalent to a standard component model in Java. The QT plug-in component 14 itself may be created as a component of GUI, permitting the functions required for the application program 8 to be constructed easily inclusively of GUI by only combining a plurality of QT plug-in components together as shown in FIG. 14 showing the QT plug-in components.

In FIG. 14, a QT plug-in manager 40 is required for management of the QT plug-in component 14 to provide the functions of looking up the appropriate QT plug-in component 14 to provide an instantiating function according to a request from the application program 8.

A QT plug-in descriptor 41 is equivalent to an interface, in which a method of acquiring information relating to each QT plug-in component 14 is described, and is packaged and provided by a developer of the QT plug-in component 14.

FIG. 15 shows the QT plug-in descriptor 41. The QT plug-in descriptor 41 shown in FIG. 15 contains various information such as the kind of service specified as a Java class/interface provided from the QT plug-in component, the developer and version information, and the application program 8 is configured to retrieve the required QT plug-in component on the basis of these information.

In FIG. 14, a QT plug-in template 42 is used for specifying the QT plug-in component required for the application program 8 to retrieve the QT plug-in component. Matching of the QT plug-in template 42 with the value of the QT plug-in descriptor 41 described the above is required for retrieval of the QT plug-in component. In this case, a null value is treated as a wild card.

Figure 16:
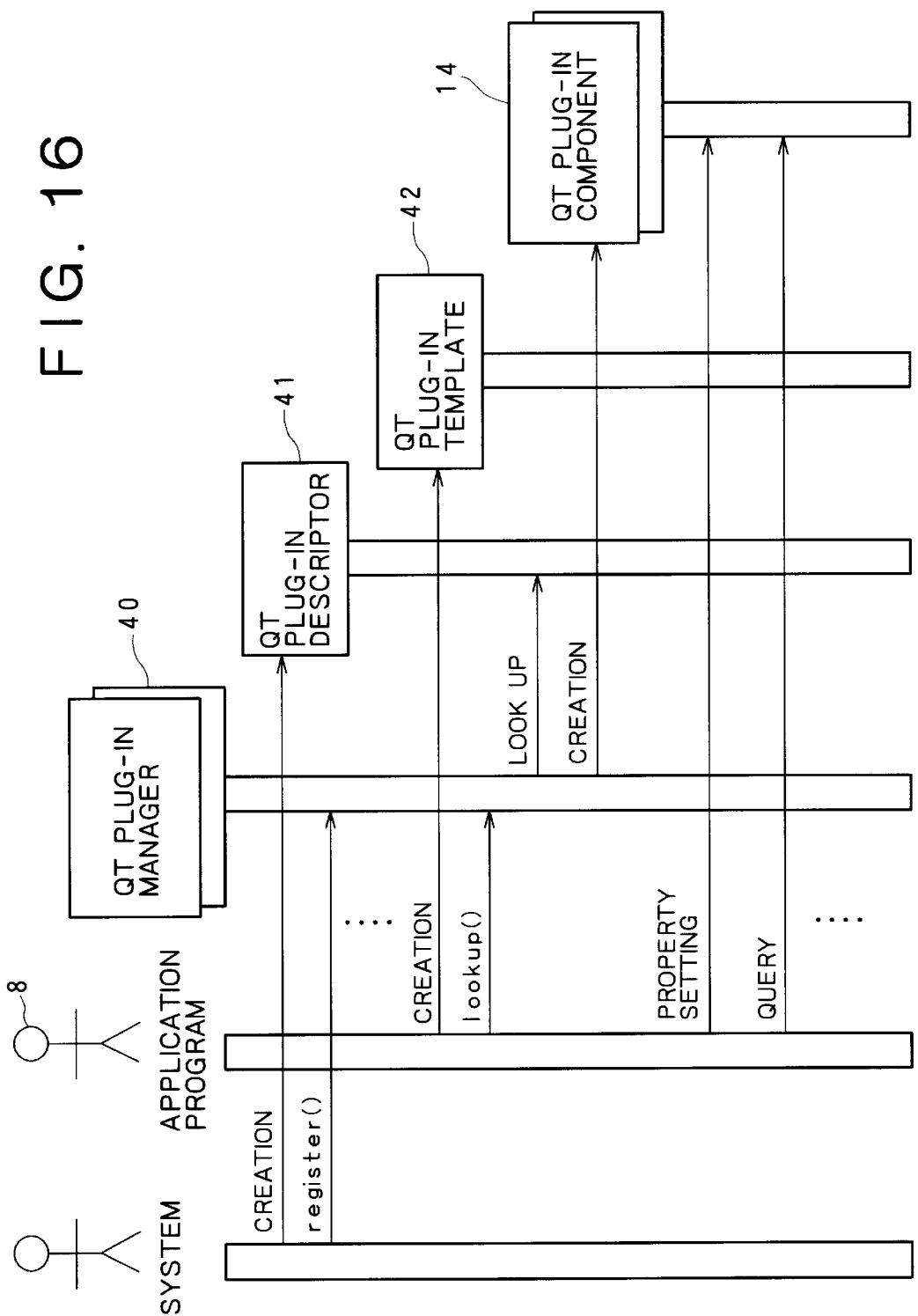
FIG. 16 is a sequence diagram showing the procedure with the use of a query interface package 12.

FIG. 16 is a sequence diagram showing the procedure with the use of the query interface package 12. As shown in FIG. 16, prior to running of the application program 8, the system needs to register the packaging class of the QT plug-in descriptor 41 corresponding to the applicable QT plug-in component 14 in the QT plug-in manager 40.

Subsequently, the application program 8 runs to create the QT plug-in template 42 for description of the required information of the QT plug-in component 14.

Then, the application program 8 calls a function of lookup ( ) to the QT plug-in manager 40 with the created QT plug-in template 42 as argument.

Matching of the given QT plug-in template 42 with all the QT plug-in descriptors 41 registered at this point of time is performed in the QT plug-in manager 40 to create an instance of the QT plug-in component 14 as to the matched QT plug-in template, and the created instance is then returned to the application program 8.

The application program 8 sets properties of the QT plug-in component 14 or registers an event listener so as to match the purposes of the application program itself.

The application program 8 supplies a query to the QT plug-in component 14 to receive the required service, providing an access to the media data database package 10 and the meta-data database package 11 as described the above.

While the preferred embodiments of the present invention have been described in the foregoing, it is to be understood that the present invention is not limited to the above embodiments, and that various changes and modifications are possible without departing from the spirit and scope of the present invention.

What is claimed is:

1. A computer program for an audiovisual apparatus that stores and replays media data, comprising:

media data management means providing media data management functions including replaying, readout, recording, deletion and synthesis of media data, and recording of an access history to media data;

meta-data management means providing meta-data management functions including readout, recording and creation of meta-data, and transaction processing attendant upon an access to meta-data; and query means providing a highly abstractive access interface for an application program through vicarious execution of processing for an access to said media data management means and said meta-data management means, wherein said computer program is configured to provide functions as a database of said media data for said application program as a whole, wherein functions of said query means to provide highly abstractive access interface for the application program through vicarious execution of the processing for an access to said media data management means and said meta-data management means are separated as an independent plug-in components, and said computer program is configured to provide a function to incorporate dynamically said plug-in component into a system, a function of aborting a disused plug-in component, and a function of searching for a plug-in component that satisfies a condition indicated by an application program out of already incorporated plug-in components.

2. The computer program according to claim 1, wherein said media data management means is configured to record an access history to said media data by converting access history information into meta-data for recording into said meta-data management means.

3. The computer program according to claim 1, wherein said media data management means is configured to record said media data by creating meta-data for recording into said meta-data management means through application of a pre-registered data analysis process on inputted media data.

4. The computer program according to claims 1, wherein said meta-data management functions of said meta-data management means are separated as an independent plug-in component, and said computer program is configured to provide a function to incorporate dynamically said plug-in component into a system, a function of aborting a disused plug-in component, and a function of selecting and executing automatically a plug-in component that matches a purpose of an application program out of already incorporated plug-in components.

5. A media data audiovisual apparatus having functions of recording and replaying media data, comprising:

a media data recording device for storing said media data;

a meta-data recording device for storing meta-data; and a processor for interpreting and executing an application program, wherein said media data audiovisual apparatus is installed with a computer program having:

media data management means providing media data management functions including replaying, readout, recording, deletion and synthesis of media data, and recording of an access history to media data;

meta-data management means providing meta-data management functions including readout, recording and creation of meta-data, and transaction processing attendant upon an access to meta-data; and query means providing a highly abstractive access interface for an application program through vicarious execution of processing for an access to said media data management means and said meta-data management means, wherein said computer program is configured to provide functions as a database of said media data for said application programs as a whole, wherein functions of said query means to provide highly abstractive access interface for the application program through vicarious execution of the processing for an access to said media data management means and said meta-data management means are separated as an independent plug-in component, and said computer program is configured to provide a function to incorporate dynamically said plug-in component into a system, a function of aborting a disused plug-in component, and a function of searching for a plug-in component that satisfies a condition indicated by an application program from among already incorporated plug-in components.

6. The media data audiovisual apparatus according to claim 5, wherein said media data management means is configured to record an access history to said media data by converting access history information into meta-data for recording into said meta-data management means.

7. The media data audiovisual apparatus according to claim 5, wherein said media data management means is configured to record said media data by creating meta-data for recording into said meta-data management means through application of a pre-registered data analysis process on inputted media data.

8. The media data audiovisual apparatus according to claim 5, wherein said meta-data management functions of said meta-data management means are separated as an independent plug-in component, and said computer program is configured to provide a function to incorporate dynamically said plug-in component into a system, a function of aborting a disused plug-in component, and a function of selecting and executing automatically a plug-in component that matches a purpose of an application program out of already incorporated plug-in components.

9. A computer program comprising:

media data management means providing media data management functions including replaying, readout, recording, deletion and synthesis of media data, and recording of an access history to media data;

meta-data management means providing meta-data management functions including readout, recording and creation of meta-data, and transaction processing attendant upon an access to meta-data; and query means providing an access interface for an application program through vicarious execution of processing for an access to said media data management means and said meta-data management means, wherein functions of said query means to provide access interface for the application program through vicarious execution of the processing for an access to said media data management means and said meta-data management means are separated as an independent plug-in component, and said computer program is configured to provide a function to incorporate dynamically said plug-in component into a system, a function of aborting a disused plug-in component, and a function of searching for a plug-in component that satisfies a condition indicated by an application program from among already incorporated plug-in components.

10. A memory containing a computer-executable program, wherein said computer program comprises:

media data management means providing media data management functions including replaying, readout, recording, deletion and synthesis of media data, and recording of an access history to media data;

meta-data management means providing meta-data management functions including readout, recording and creation of meta-data, and transaction processing attendant upon an access to meta-data; and query means providing an access interface for an application program through vicarious execution of processing for an access to said media data management means and said meta-data management means, wherein functions of said query means to provide access interface for the application program through vicarious execution of the processing for an access to said media data management means and said meta-data management means are separated as an independent plug-in component, and said computer program is configured to provide a function to incorporate dynamically said plug-in component into a system, a function of aborting a disused plug-in component, and a function of searching for a plug-in component that satisfies a condition indicated by an application program from among already incorporated plug-in components.

11. A method of using a computer processor to process media data using meta-data, comprising the steps of:

providing media data management functions including replaying, readout, recording, deletion and synthesis of media data, and recording of an access history to media data;

providing meta-data management functions including readout, recording and creation of meta-data, and transaction processing attendant upon an access to meta-data; and query means providing an access interface for an application program through vicarious execution of processing for an access to said media data management means and said meta-data management means, wherein functions of said query means to provide access interface for the application program through vicarious execution of the processing for an access to said media data management means and said meta-data management means are separated as an independent plug-in component, and said computer program is configured to provide a function to incorporate dynamically said plug-in component into a system, a function of aborting a disused plug-in component, and a function of searching for a plug-in component that satisfies a condition indicated by an application program from among already incorporated plug-in components.

12. An apparatus, comprising:

a first memory for storing media data;

a second memory for storing meta-data; and a processor executing an application program, wherein said apparatus is installed with a computer program comprises:

media data management means providing media data management functions including replaying, readout, recording, deletion and synthesis of media data, and recording of an access history to media data;

meta-data management means providing meta-data management functions including readout, recording and creation of meta-data, and transaction processing attendant upon an access to meta-data; and query means providing an access interface for an application program through vicarious execution of processing for an access to said media data management means and said meta-data management means, wherein functions of said query means to provide access interface for the application program through vicarious execution of the processing for an access to said media data management means and said meta-data management means are separated as an independent plug-in component, and said processor is configured to provide a function to incorporate dynamically said plug-in component into a system, a function of aborting a disused plug-in component, and a function of searching for a plug-in component that satisfies a condition indicated by an application program from among already incorporated plug-in components.

* * * * *